United States Patent [19]

Bolster

[11] Patent Number: 5,691,083
[45] Date of Patent: Nov. 25, 1997

[54] POTASSIUM ION ADDITIVES FOR VOLTAGE CONTROL AND PERFORMANCE IMPROVEMENT IN NONAQUEOUS CELLS

[75] Inventor: Mary Elizabeth Bolster, Bay Village, Ohio

[73] Assignee: Eveready Battery Company, Inc., St. Louis, Mo.

[21] Appl. No.: 487,370

[22] Filed: Jun. 7, 1995

[51] Int. Cl.⁶ .................................................. H01M 6/14
[52] U.S. Cl. ......................................................... 429/194
[58] Field of Search .................................. 429/218, 196, 429/197, 221, 224, 194

[56] References Cited

U.S. PATENT DOCUMENTS

| | | |
|---|---|---|
| 3,871,916 | 3/1975 | Kronenberg . |
| 3,951,685 | 4/1976 | Kronenberg . |
| 3,956,018 | 5/1976 | Kozawa ........................... 429/218 X |
| 3,996,069 | 12/1976 | Kronenberg . |
| 4,228,227 | 10/1980 | Saathoff et al. . |
| 4,397,921 | 8/1983 | Xenzhek et al. ................ 429/196 X |
| 4,450,214 | 5/1984 | Davis . |
| 4,505,997 | 3/1985 | Armand et al. . |
| 4,758,483 | 7/1988 | Armand et al. . |
| 4,818,644 | 4/1989 | Armand . |
| 4,851,307 | 7/1989 | Armand et al. . |
| 4,861,573 | 8/1989 | deNeufville et al. . |
| 4,889,779 | 12/1989 | Connolly et al. .................. 429/196 |
| 5,151,335 | 9/1992 | Ryan .................................. 429/194 |
| 5,273,840 | 12/1993 | Dominey . |

FOREIGN PATENT DOCUMENTS

| | | |
|---|---|---|
| 49-57194 | 5/1974 | Japan . |
| 54-12611 | 5/1979 | Japan . |
| 56-38774 | 4/1981 | Japan . |
| 61-218069 | 9/1986 | Japan . |
| 62-64064 | 3/1987 | Japan . |
| 63-226881 | 9/1988 | Japan . |
| 63-257183 | 10/1988 | Japan . |

*Primary Examiner*—Donald R. Valentine
*Attorney, Agent, or Firm*—Robert W. Welsh; S. Allan Fraser

[57] ABSTRACT

An electrochemical cell having a lithium or lithium alloy anode, a solid cathode, and a nonaqueous, liquid electrolyte, includes an amount of a potassium salt which is effective to lower the open circuit voltage of the cell without causing any significant detrimental effects such as corrosion of the anode or self discharge of the cell. More specifically, the electrolyte comprises one or more organic solvents, an electrochemically active amount of one or more primary salts, and more than about 0.001 mol/l of one or more potassium salt additives which achieve the desired open circuit voltage without any harmful effects on the cell. The potassium salt additives have also been found to enhance load voltage on the first 50% depth of discharge, indicating improved rate performance.

20 Claims, 5 Drawing Sheets

POTASSIUM ION ADDITIVES FOR VOLTAGE CONTROL AND PERFORMANCE IMPROVEMENT IN NONAQUEOUS CELLS

BACKGROUND

This invention relates to electrochemical cells having a lithium anode or lithium alloy anode, a solid cathode and a nonaqueous, liquid electrolyte, and more particularly to such cells containing a potassium salt additive which lowers the open circuit voltage to a desirable level without causing any significant detrimental effects.

Lithium/iron disulfide cells typically have an open circuit voltage (OCV) of about 1.8 which may be considered to be too high for some electronic applications. It is generally desirable to lower the OCV to less than 1.75 volts, and preferably to about 1.72 volts or less to achieve wider acceptance of such cells.

The use of salts or complex salts of elements in Groups IA, IIA and IIIA of the Periodic Table as solutes for organic nonaqueous electrolytes in cells with anodes comprised of highly reactive metal anodes, such as lithium, sodium and potassium, is well known. The salt selected, however, must be compatible and not reactive with the electrolyte solvent and the electrodes. For example, solutes of the general formulae $MBF_4$, $MClO_4$, $MM'F_6$, $MCF_3SO_3$, and MCSN (wherein M is lithium, sodium or potassium and M' is phosphorus, arsenic or antimony) are disclosed in U.S. Pat. Nos. 3,871,916; 3,951,685 and 3,996,069 with a variety of organic solvents, including tetrahydrofuran (THF), dioxolane (DIOX), dimethoxyethane (DME), dimethyl isoxazole (DMI), diethyl carbonate (DEC), ethylene glycol sulfite (EGS), dioxane, dimethyl sulfite (DMS) or the like. U.S. Pat. Nos. 4,505,997 and 4,758,483 describe polymeric electrolytes with ionizable compounds or salts which may have alkali metal cations. Ionically conductive organic materials disclosed in U.S. Pat. Nos. 4,818,644; 4,851,307 and 5,273,840 may also contain metallic cations.

Salts and complex salts of elements in Groups IA, IIA and IIIA of the periodic table are also disclosed as additives, used in addition to the primary solutes of organic nonaqueous electrolytes in certain combinations and with certain solvents for specific purposes. For example, U.S. Pat. No. 4,450,214 discloses the addition of lithium iodide, with lithium hexafluoroarsenate as the main solute, to inhibit the formation of undesirable films on the surface of lithium anodes. Coating at least one electrode with a layer of a compound having the formula $Li_xMF_y$, where M is selected from the group consisting of As, Ge, Mo, P, Sb, Si and W, for the purpose of creating a barrier to electrolyte is taught in U.S. Pat. No. 4,861,573. Lithium iodide added to electrolyte with lithium hexafluoroarsenate as the primary solute is described in U.S. Pat. No. 4,228,227 in order to improve the efficiency of redepositing lithium on the anode of a rechargeable lithium cell during recharging.

Examined Japanese Patent Publication No. 54-12611 discloses the addition of an inorganic sodium or potassium salt to organic electrolyte cells with lithium as the negative electrode and $(CF_x)_n$ as the positive electrode active material. The purpose of doing so is to prevent passivation of the lithium anode by the electrolyte solvent (γ-butyrolactone). Such passivation causes increased internal resistance and a change in the OCV. The primary electrolyte salt that is taught is lithium perchlorate, which is undesirable for safety reasons. In the example given, 5 wt. % $NaClO_4$ is added to the cathode.

In cells with lithium as the negative electrode, the OCV can increase during storage as a result of either moisture ingress into the cell or the reaction of impurities in the positive electrode with the lithium electrode. Unexamined Japanese Patent Publication No. 63-226881 teaches the use of lithium-aluminum alloy as the negative electrode as a means of retarding such an OCV increase during storage. Unexamined Japanese Patent Publication No. 03-37964 discloses the use of a mixed alloy layer with aluminum on the lithium surface for the same purpose. Unexamined Japanese Patent Publication No. 63-257183 teaches adding aluminum perchlorate to the electrolyte to form a lithium-aluminum layer on the negative electrode surface, preventing OCV increase during storage. Unexamined Japanese Patent Publication No. 61-218069 discloses the addition of $KClO_4$ or KCl at a concentration of 0.0001 to 0.001 mol/l, and unexamined Japanese Patent Publication No. 62-64064 discloses the addition of $KPF_6$ at a concentration of 0.01 to 0.1 mol/l, both to a nonaqueous electrolyte (1.0 mol/l $LiClO_4$ in propylene carbonate/dimethoxyethane solvent) to form a Li-K coating on the Li surface, to retard formation of LiOH in the presence of moisture in the cell, or to react with impurities or other undesirable active materials in the cathode.

Unexamined Japanese Patent Publication No. 56-38774 teaches the addition of one or more iodide salts of lithium, sodium, potassium and magnesium to cells with carbon fluoride positive electrodes to lower the normal OCV of the cell by about 0.3 volts through the reaction of iodide with fluorine liberated from the positive electrode. The cation does not take part in the reactions that lower the OCV, it being the iodide anion which is essential to achieving lower OCV through reaction with the carbon fluoride cathode. Furthermore, unexamined Japanese Patent Publication No. 56-38774 teaches that there is a small undesirable effect (a lag in operating voltage during the early stages of discharge) when NaI, KI or $MgI_2$ are used. This is attributed to partial precipitation of sodium, potassium or magnesium on the cathode.

SUMMARY

The present invention provides an electrochemical cell with a lithium or lithium alloy anode, a solid cathode and a nonaqueous, liquid electrolyte which includes a potassium salt additive which lowers the OCV to a desirable level and provides improved cell performance without any significant accompanying adverse effects. More specifically, it has been unexpectedly found that by adding a relatively minor amount of potassium ion to the electrolyte a beneficial effect on OCV cell operating voltage and flash discharge performance is achieved.

In accordance with a preferred aspect of the invention, there is provided an electrochemical cell having a lithium anode or a lithium alloy anode, a solid cathode and a nonaqueous, liquid electrolyte including an electrochemically active amount of a primary salt other than lithium perchlorate, and an amount of a potassium salt which is effective to lower OCV while avoiding any significant adverse effects such as corrosion or self-discharge. By avoiding lithium perchlorate as the primary conductive solute, a safer cell which achieves the desired OCV and performance requirements is provided.

In accordance with a further aspect of the invention, the desired OCV and performance requirements are achieved with an electrochemical cell having a lithium or lithium alloy anode, a solid cathode comprising $FeS_2$, $MnO_2$ or $TiS_2$, and an electrolyte containing about 0.005 to 0.1 mol/l of a potassium salt.

An additional aspect of the invention involves the use of specific lithium salts including lithium halides, lithium hexafluorophosphates, lithium hexafluoroarsenates, lithium trifluoromethanesulfonate or combinations thereof which are used in an electrochemically active amount in combination with more than 0.001 mol/l of selected potassium salt additives to achieve the desired OCV lowering. The selected potassium salt additives include potassium trifluoromethanesulfonate, potassium carbonate, potassium tetrafluoroborate, potassium tetraalkyl borates, potassium tetraphenylborates, potassium halides, potassium hexafluorophosphate, potassium perfluoroalkyl sulfonates and combinations thereof.

The electrochemical cells of the invention achieve an OCV lowering of about 50 to 100 millivolts, whereby a desirable OCV of from about 1.72 to less than 1.75 volts is achieved. Additionally, the invention has exhibited enhanced load voltage on the first 50 % depth of discharge, indicating improved rate performance benefits. The foregoing advantages have been achieved without observing any significant disadvantages or adverse results.

DESCRIPTION OF THE PREFERRED EMBODIMENTS

The anode can be comprised of substantially pure lithium or a lithium alloy. Alternatively, the lithium can also be intercalated into a host material such as carbon or another low potential host material which is intercalatable.

The active materials of the cathode can be comprised of any of various commonly employed reducible materials such as $MnO_2$, $CoO_2$, CuO, $Bi_2O_3$, FeS, fluorinated carbons $((CF_x)_n)$, $TiS_2$, $NbSe_3$, $MoS_2$, $V_6O_{13}$, $V_2O_5$, $FeS_2$, $Cr_3O_8$, etc., with preferred active materials including transition metal oxides and sulfides such as $FeS_2$, $MnO_2$ and $TiS_2$, and fluorinated carbons with $FeS_2$ as being most preferred. The cathodes are preferably prepared by mixing the active, reducible material with a conductive agent such as graphite, carbon or the like and a binder such as polytetrafluoroethylene, ethylene acrylic acid copolymer or the like to produce a cohesive solid cathode.

Suitable nonaqueous, liquid electrolytes for use with the invention are comprised of one or more organic solvents which are generally unreactive with the electrodes, capable of dissolving an electrochemically active amount of lithium salt and an amount of a potassium salt which is effective to lower the open circuit voltage of the electrochemical cell, and which when combined with the lithium and potassium salts forms an electrolyte exhibiting adequate conductivity, e.g. at least about $10^{-5}$ $ohm^{-1}$ $cm^{-1}$. The nonaqueous, liquid electrolytes also contain an amount of a primary conductive solute or metal salt which provides the desired conductivity, and a relatively minor amount of a potassium salt additive which lowers the open circuit voltage of the electrochemical cell without having any significant detrimental effect on cell performance, while generally providing an improvement in performance on heavy drain discharge. More specifically, the primary salt, or mixture of primary salts, is utilized in an amount of at least about 0.1 mol/l. Useful electrolytes for certain applications can contain up to about 5 mol/l or more of a primary salt or a mixture of primary salts. More typically, the primary salt, or mixture of primary salts, is present in an amount of about 0.5 to 2 mol/l.

A relatively small amount of a potassium salt has been found to reduce the open circuit voltage of the electrochemical cells without adversely affecting cell performance. The effect of potassium ions in the electrolyte is generally nonlinear with concentration. However, even very low amounts of potassium salt, or a mixture of potassium salts, have been found to lower the open circuit voltage of the electrochemical cells of the invention. Accordingly, there is not a readily discernible lower limit on the amount of potassium salt, or mixture of potassium salts, which is useful for lowering the open circuit voltage of the cells, although significant decreases in the open circuit voltage are not generally realized unless the potassium salt, or mixture of potassium salts, is present in an amount of greater than about 0.001 mol/l. In order to avoid detrimental effects on cell performance, due for instance to corrosion of the lithium or lithium alloy anode or self discharge of the electrochemical cell, the potassium salt, or mixture of potassium salts, is generally utilized in an amount of less than about 0.5 mol/l. More typically, satisfactory results are achieved when the potassium salt, or mixture of potassium salts, is present in the electrolyte in an amount of from about 0.005 to 0.1 mol/l, and more preferably from about 0.01 to 0.05 mol/l.

Organic solvents which can be used in preparing the electrolytes useful in the invention include acyclic ethers such as dimethoxyethane and diethyl ether; cyclic ethers such as tetrahydrofuran, dioxolane, dioxane, methyl tetrahydrofuran, dimethyl tetrahydrofuran and methyldioxolane; acyclic carbonates such as dimethyl carbonate and diethyl carbonate; cyclic carbonates such as ethylene carbonate and propylene carbonate; formates such as methyl formate and ethyl formate; amides such as dimethyl formamide and diethyl formamide; lactones such as γ-butyrolactone; sulfones such as dimethyl sulfone and tetramethylene; nitriles such as acetonitrile and benzonitriles; and nitrated compounds such as nitromethane and nitrobenzene. Other organic solvents which may be utilized include 3-methyl-2-oxazolidinone, dimethyl isoxazole, ethylene glycol sulfite, dimethyl sulfite, sulfolane, sulfur dioxide, and dimethyl sulfoxide. Preferred solvents include acyclic ethers, cyclic ethers, acyclic carbonates, formates, amides, sulfones, nitriles, vitromethane, 3,5-dimethylisoxazole, cyclic carbonates, γ-butyrolactone, and combinations thereof. Most preferably, the organic solvent is an ether such as dioxolane, dimethoxyethane or tetrahydrofuran, or a mixture of organic solvents wherein one or more ethers comprise at least about 90 percent by volume of the solvent mixture.

Conductive solutes which can be used as the primary salt in the invention include a variety of metal salts which are sufficiently soluble in the selected organic solvent or solvents to achieve the required conductivity and electrochemical activity. It is also desirable that the ions formed upon dissolving the metal salts in the organic solvent do not have a deleterious effect on the cell components. For example, the unions formed when the metal salts are dissolved in the selected organic solvent, or mixture of solvents, should not react with the solvents, electrodes or structural components of the electrochemical cell. Additionally, it is desirable that the conductive solutes (metal salts) used in the invention be nontoxic and otherwise safe, e.g. nonexplosive. For example, compounds represented by the general formula $MClO_4$, wherein M is a metal, are not desirable for use with the invention because of the potentially explosive character of the perchlorate ions, although they can be used. Examples of metal salts which can be used in preparing the electrolyte include LiHa, $LiBF_4$, $LiPF_6$, $LiAsF_6$, $LiClO_4$, $LiAlCl_4$, $LiSbF_6$, $LiCF_3SO_3$, $Li(CF_3SO_2)_2N$ and LiSCN, wherein Ha is a halide such as fluorine, chlorine, bromine or iodine. Other primary salts which can be used include lithium carbonate, lithium tetraalkylborates and tetraphenylborates, lithium perfluoroalkylsulfonates, lithium bis(perfluoroalkylsulfonyl)imides, lithium tetra(perfluoroalkylsulfonyl)phosphates, lithium di- and tri-substituted perfluoroalkylsulfonyl methides, and lithium di- and tri-substituted alkylcarbonyl methides. Preferred metal salts for use in the invention include lithium hexafluoroarsenate ($LiAsF_6$) lithium tetrafluoroborate ($LiBF_4$), and lithium trifluoromethanesulfonate ($LiCF_3SO_3$). Other desirable metal salts include LiBr, LiI and $LiPF_6$, which are believed to provide the best overall performance in the electrochemical cells of the invention. The preferred primary conductive solute or metal salt for use in the invention is $LiCF_3SO_3$.

The potassium ion additives which can be used to lower the open circuit voltage (OCV) of the electrochemical cells of this invention generally include any potassium salt which will dissolve in the selected organic solvents to provide potassium ions at the required concentration which is effective to significantly reduce OCV. More specifically, the potassium salt, or a mixture of potassium salts, should be sufficiently soluble in the selected organic solvent (or mixture of organic solvents) to provide a potassium ion concentration in the electrolyte of from at least about 0.001 mol/l up to about 0.5 mol/l, although potassium ion concentrations from about 0.005 to 0.1 mol/l are more typically deskable. As with the primary salt (generally a lithium salt), or mixture of primary salts, the potassium salt additive should have an anion component which is substantially unreactive with the electrodes, solvents and structural components of the electrochemical cell, and which is preferably substantially nontoxic and otherwise safe. Suitable potassium salt additives include potassium trifluoromethanesulfonate, potassium carbonate, potassium hexafluoroarsenate, potassium tetrafluoroborate, potassium tetraalkylborates, potassium tetraphenylborates, potassium halides, potassium perchlorate, potassium hexafluorophosphate, potassium perfluoroalkylsulfonates, potassium bis(perfluoroalkylsulfonyl)imides, potassium tetris(perfluoroalkylsulfonyl)phosphates, potassium bis(perfluoroalkylsulfonyl)methides, potassium tris(perfluoroalkylsulfonyl)methides, potassium bis(,perfluoroalkylcarbonyl)methides, potassium tris(perfluoroalkylcarbonyl)methides, and combinations thereof. Preferred potassium salt additives for use in the invention include potassium carbonate, potassium tetrafluoroborate, potassium tetraalkyl- and tetraphenylborates, potassium halides, potassium hexafluorophosphate and potassium perfluoroalkylsulfonates (e.g. $KCF_3SO_3$), with potassium trifluoromethanesulfonate being particularly preferred.

The invention is described in further detail with respect to specific illustrative examples set forth below:

EXAMPLE 1

Figure 1:
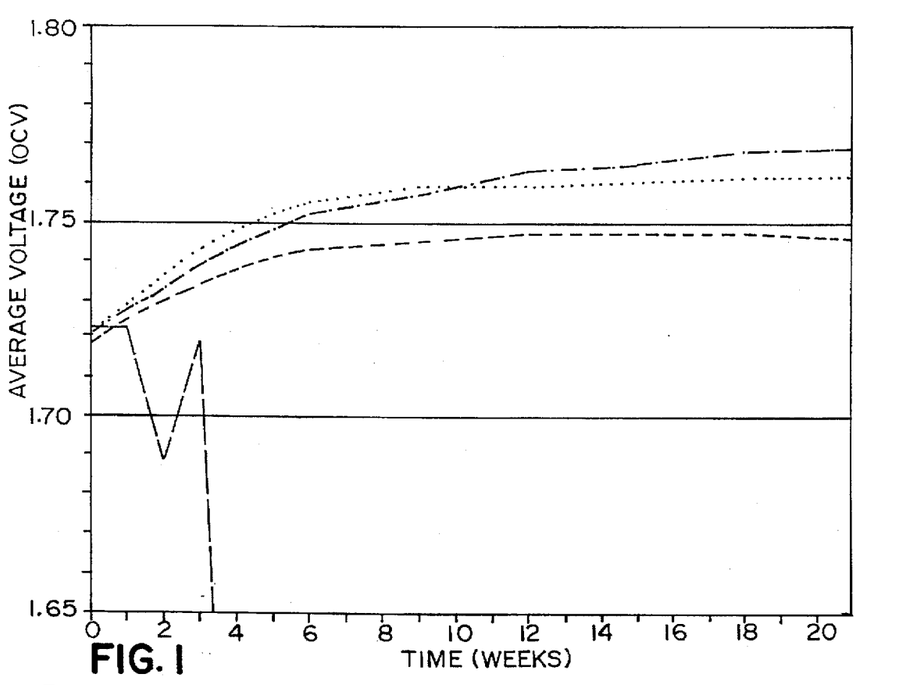
FIG. 1 is a graph showing the OCV as a function of time for cells containing various levels of $NaCF_3SO_3$ as an additive.

A first set of cells comprising a lithium anode and an iron disulfide cathode was prepared with an electrolyte of about 25 vol. % 1,3-dioxolane, 75 vol. % 1,2-dimethoxyethane, 0.2 vol. % 3,5-dimethylisoxazole, and about 1 mol/l of lithium trifluoromethanesulfonate. Approximately 0.01 mol/l of sodium trifluoromethanesulfonate was added to the electrolyte. Two additional sets of cells were prepared in substantially identical manner, except about 0.001 mol/l of sodium trifluoromethanesulfonate was added to one set of cells and 0.1 mol/l of sodium trifluoromethanesulfonate was added to the other sets of cells. The open circuit voltages (OCV) were tested for each of these sets of cells having the sodium trifluoromethanesulfonate ($NaCF_3SO_3$) additive. A control set which did not contain any $NaCF_3SO_3$, but which was otherwise identical, was prepared. The results are set forth in FIG. 1 which shows that the cells containing 0.001 mol/l of $NaCF_3SO_3$ exhibited only a slightly lower OCV (about 1.745) than the control. The cells containing 0.01 mol/l of $NaCF_3SO_3$ were unsuccessful at lowering OCV, and after about 10 weeks actually had an OCV greater than the control cells. The cells containing 0.1 mol/l of $NaCF_3SO_3$ demonstrated a drastic, undesirable drop in OCV within 3–4 weeks and cell venting occurred at about 9 weeks. The results show that $NaCF_3SO_3$ is not a useful additive for lowering the OCV to the desired value of about 1.72 volts or less.

Figure 2:
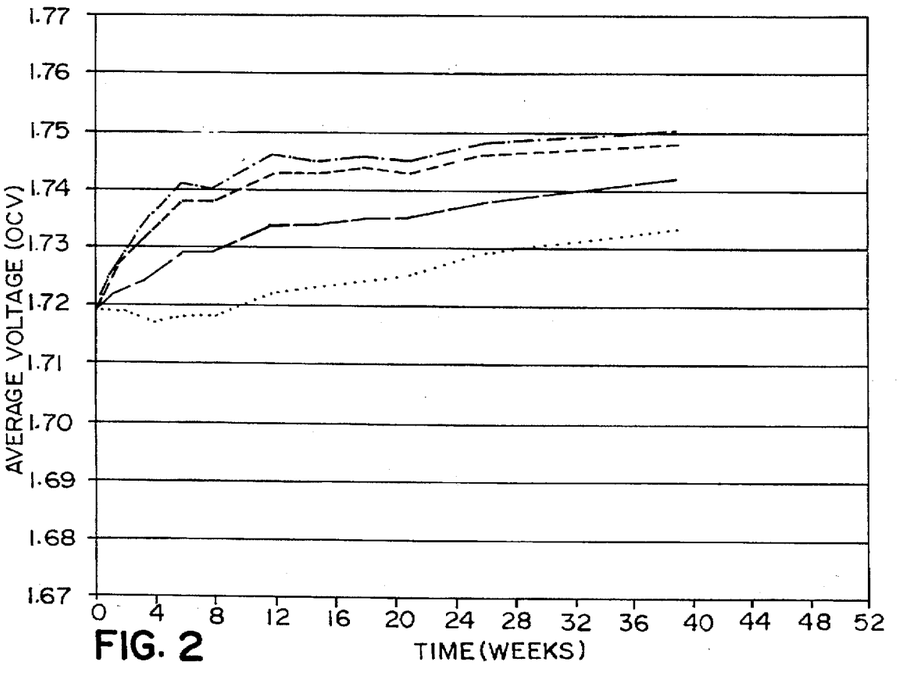
FIG. 2 is a graph showing the OCV as a function of time for cells as above as above, but with "$KCF_3SO_3$"

A similar series of cells with substantially identical electrodes and electrolytes were prepared with about 0.001, 0.005 and 0.01 mol/l of potassium trifluoromethanesulfonate ($KCF_3SO_3$) additive, and evaluated to determine the effect of $KCF_3SO_3$ on OCV. The results, shown in FIG. 2, unexpectedly demonstrate that even a small amount of $KCF_3SO_3$ consistently lowers OCV as compared with a control which does not contain any $KCF_3SO_3$.

For comparison, the results of the above tests are summarized at 8, 26 and 52 weeks in Table I.

TABLE I

| Concentration | OCV @ 8 Wks | | OCV @ 26 Wks | | OCV @ 52 Wks | | (MV) Net Effect | |
|---|---|---|---|---|---|---|---|---|
| mol/l | $NaCF_3SO_3$ | $KCF_3SO_3$ | $NaCF_3SO_3$ | $KCF_3SO_3$ | $NaCF_3SO_3$ | $KCF_3SO_3$ | $NaCF_3SO_3$ | $KCF_3SO_3$ |
| Control | 1.763 | 1.740 | 1.763 | 1.748 | 1.764 | 1.750 | — | — |
| 0.001 | 1.757 | 1.738 | 1.760 | 1.746 | 1.761 | 1.748 | −3 | −2 |

TABLE I-continued

| Concentration | OCV @ 8 Wks | | OCV @ 26 Wks | | OCV @ 52 Wks | | (MV) Net Effect | |
| --- | --- | --- | --- | --- | --- | --- | --- | --- |
| mol/l | $NaCF_3SO_3$ | $KCF_3SO_3$ | $NaCF_3SO_3$ | $KCF_3SO_3$ | $NaCF_3SO_3$ | $KCF_3SO_3$ | $NaCF_3SO_3$ | $KCF_3SO_3$ |
| 0.005 | N/A | 1.729 | N/A | 1.737 | N/A | N/A | N/A | −11 |
| 0.01 | 1.717 | 1.718 | 1.723 | 1.729 | 1.729 | N/A | −35 | −20 |
| 0.1 | 1.692 | N/A | 1.685 | N/A | 1.689 | N/A | −75 | N/A |

EXAMPLE 2

A series of cells was prepared with the electrodes and electrolyte set forth above in Example 1, in which were added about 0.001, 0.01 and 0.1 mol/l of $KCF_3SO_3$. A National camera flash test was carried out after storage of the cells, including control cells which did not contain any $KCF_3SO_3$, for four weeks at 60° C. The test involves installing the cells (size "AA") in a National PE320S "hot shoe" camera flash unit, setting the flash unit on "manual" mode at half power, and turning the flash unit on. After the "ready" light is illuminated, the flash unit is flashed and the time from the flash until the "ready" light is reilluminated is measured. Each flash represents one cycle. The unit is flashed every 30 seconds.

The results of the first and tenth flash are set forth below in Table II.

TABLE II

| | Recycle time (secs) | |
| --- | --- | --- |
| Concentration of $KCF_3SO_3$ (mol/l) | 1st | 10th |
| Control (zero) | 12.2 | 13.0 |
| 0.001 | 11.3 | 12.9 |
| 0.01 | 11.1 | 11.0 |
| 0.1 | 11.9 | 11.1 |

The results show that an advantage of about 1–2 seconds was observed for the potassium ion ($K^+$) additive, with the best performance observed at the 0.01 mol/l level. Additionally, the load voltage on the first 50 % depth of discharge was observed to increase with increasing $K^+$ level, indicating rate performance benefits.

EXAMPLE 3

Figure 3:
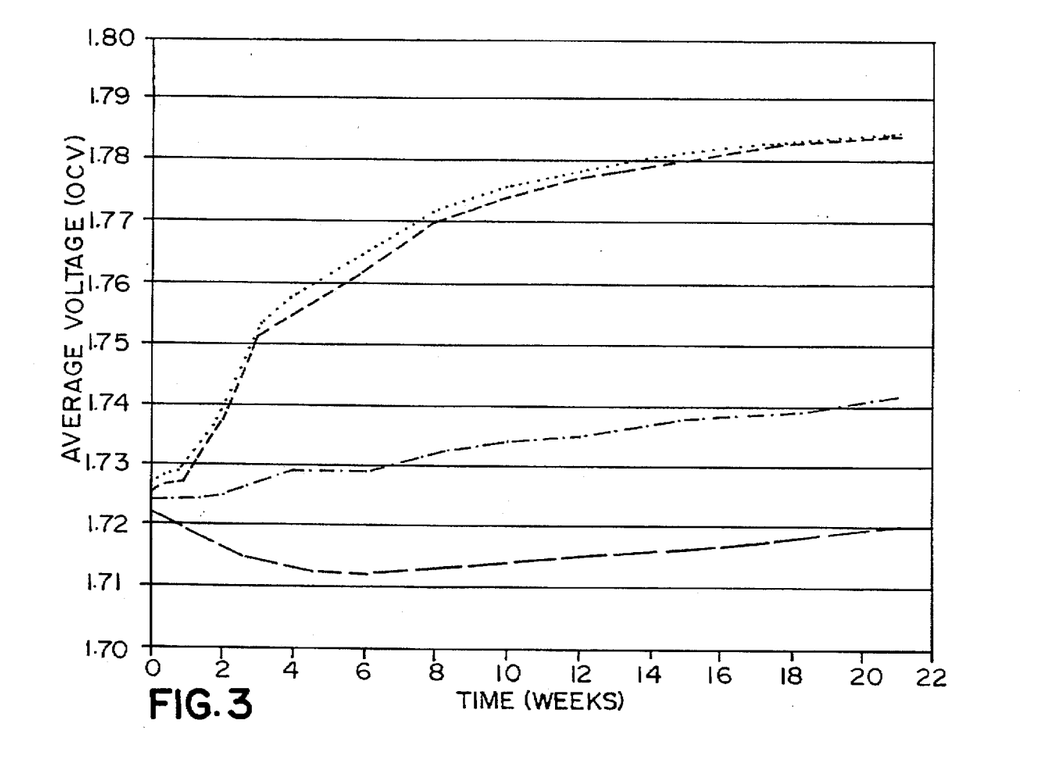
FIG. 3 is a graph of OCV verses time comparing the effects of $NaCF_3SO_3$ and $KCF_3SO_3$ as additives for cells having a lithium-aluminum anode and for cells having a lithium anode.

Control cells were prepared using lithium anodes, $FeS_2$ cathodes and the electrolyte solution set forth above in Example 1. Another set of control cells was prepared in a substantially identical manner, except using a lithium-aluminum alloy as the anodes. Cells identical with the two control cells, but containing about 0.05 mol/l (added to the electrolyte) of $KCF_3SO_3$, were also prepared. The cells were then tested to determine OCV as a function of time. The results, as shown in FIG. 3, demonstrate that $KCF_3SO_3$ is also effective in lowering the OCV of cells having a lithium-aluminum alloy anode. In fact, surprisingly the $KCF_3SO_3$ has a greater effect on lowering OCV for the cells with a lithium-aluminum alloy anode than for those having a lithium anode, whereas there is essentially no difference between the OCV for the two controls.

EXAMPLE 4

Figure 4:
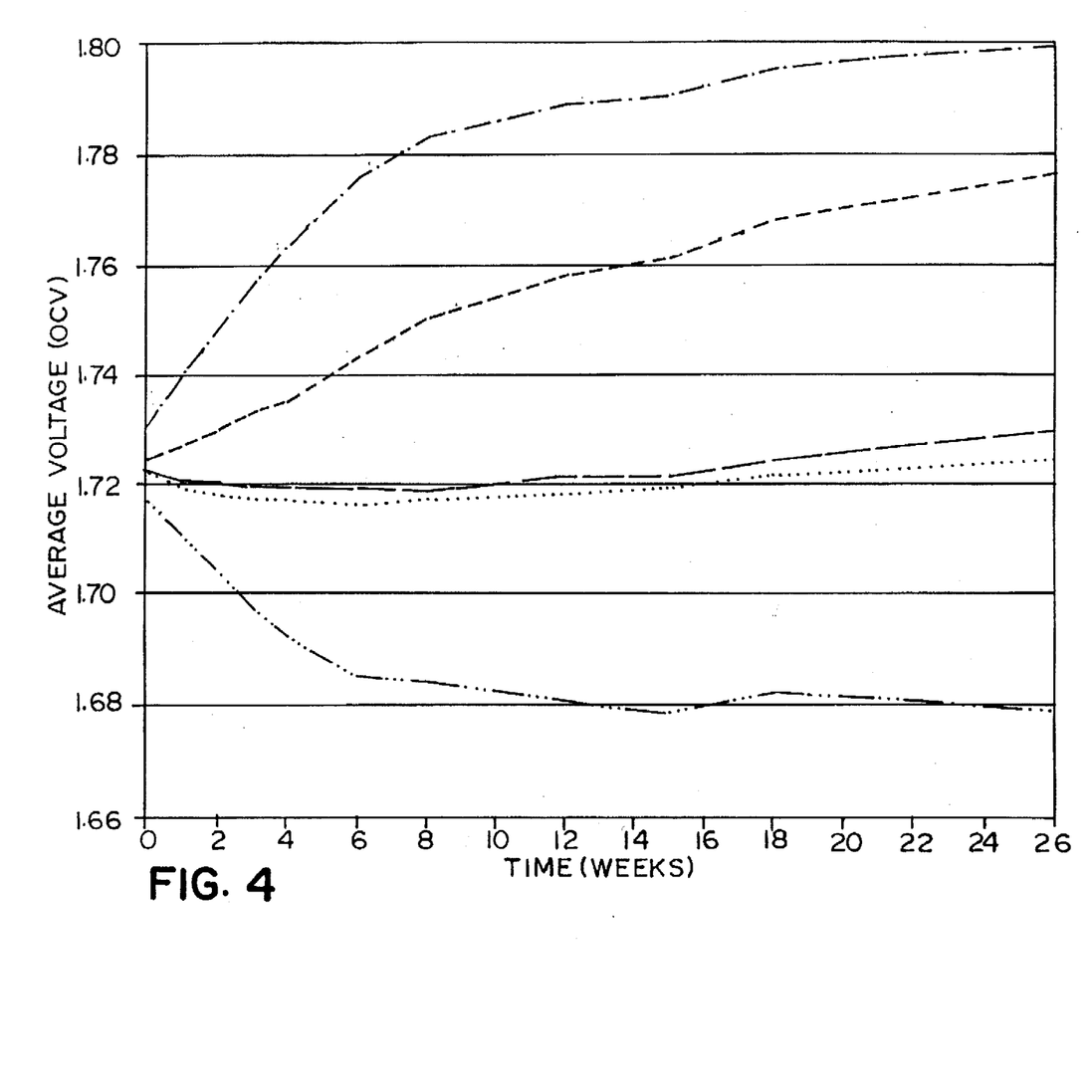
FIG. 4 is a graph of OCV verses time for cells having an electrolyte which is free of the organic OCV lowering agent 3,5-dimethylisoxazole.

A series of cells was prepared with a Li anode and a $FeS_2$ cathode using an electrolyte compound of about 1.0 mol/l of $LiCF_3SO_3$ in a solution of 25 vol. % 1,3-dioxolane and 75 vol. % 1,2-dimethoxyethane to evaluate the utility of the invention in an electrolyte which is free of 3,5-dimethylisoxazole (an organic solvent which tends to lower OCV). In addition to the control cells, which did not include a potassium salt additive, cells were prepared with about 0.01, 0.05, 0.1 and 0.25 mol/l of $KCF_3SO_3$ additive. The results, shown in FIG. 4, demonstrate the $KCF_3SO_3$ additive provides OCV suppressions of from about 10 mV to 120 mV, even in the absence of the 3,5-dimethylisoxazole. A concentration of about 0.05 mol/l of $KCF_3SO_3$ was found to be most useful in maintaining a desirable OCV of from about 1.72 to 1.725 volts.

EXAMPLE 5

Figure 5:
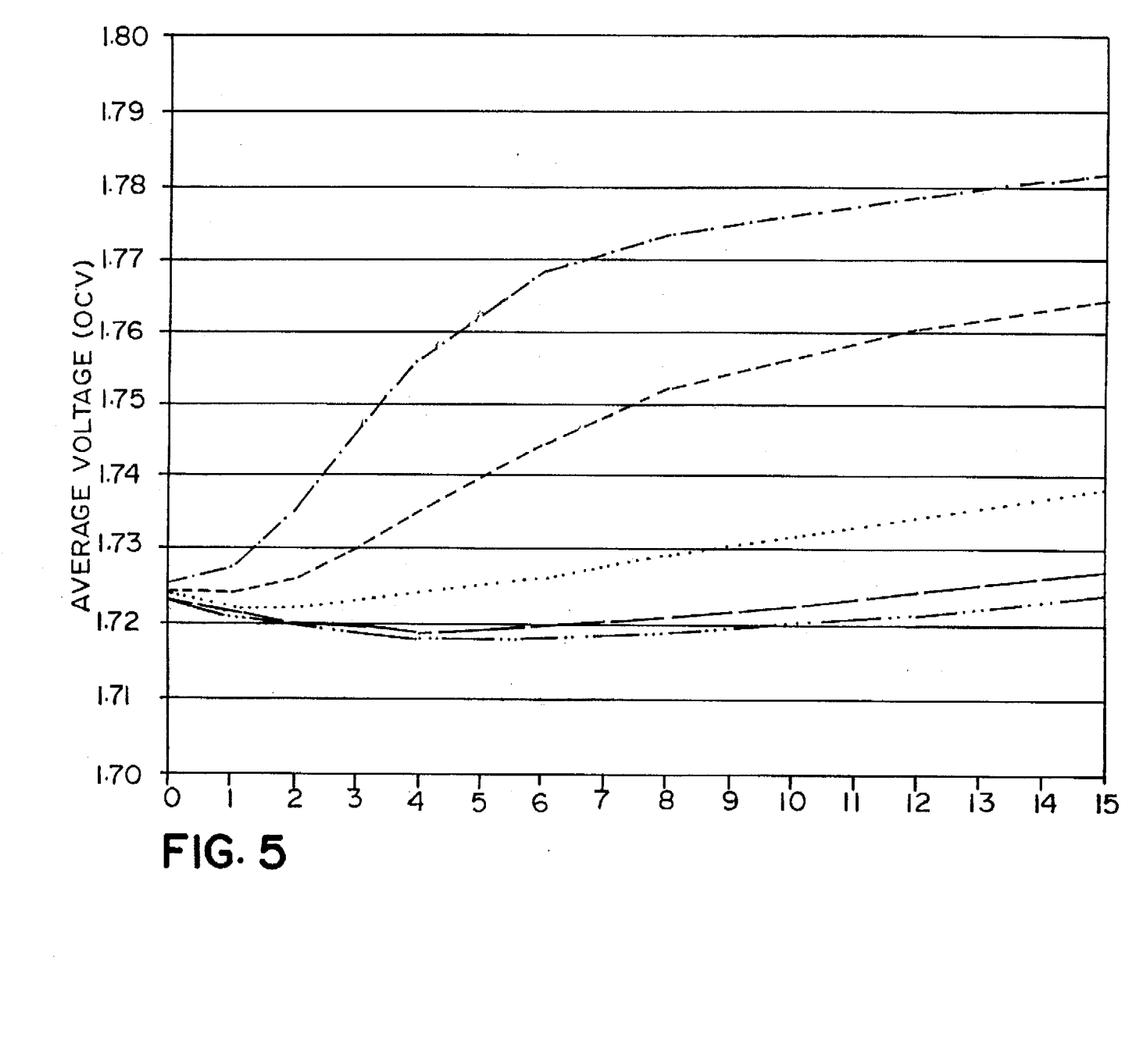
FIG. 5 is a graph of OCV verses time for cells containing a mixture of LiI and $LiCF_3SO_3$ in the electrolyte as a primary conductive solute, and containing various levels of KI as an additive.

The effect of KI as an additive for lowering OCV was evaluated on $Li/FeS_2$ cells by adding about 0.01, 0.02, 0.03 and 0.04 mol/l of KI to an electrolyte comprised of about 0.75 mol/l of a mixed lithium salt comprised of 50 mol % LiI and 50 mol % $LiCF_3SO_3$ in an organic solvent solution consisting of 25 vol. % 1,3-dioxolane and 75 vol. % 1,2-dimethoxyethane. The results shown in FIG. 5, demonstrate that potassium salt additives other than $KCF_3SO_3$, namely KI, also beneficially reduce OCV in $Li/FeS_2$ cells. OCV suppression after 15 weeks was from about 10 to 55 mV. A concentration of 0.03 mol/l of KI was found effective to lower OCV to a 1.72 to 1.725 volt level.

EXAMPLE 6

Figure 6:
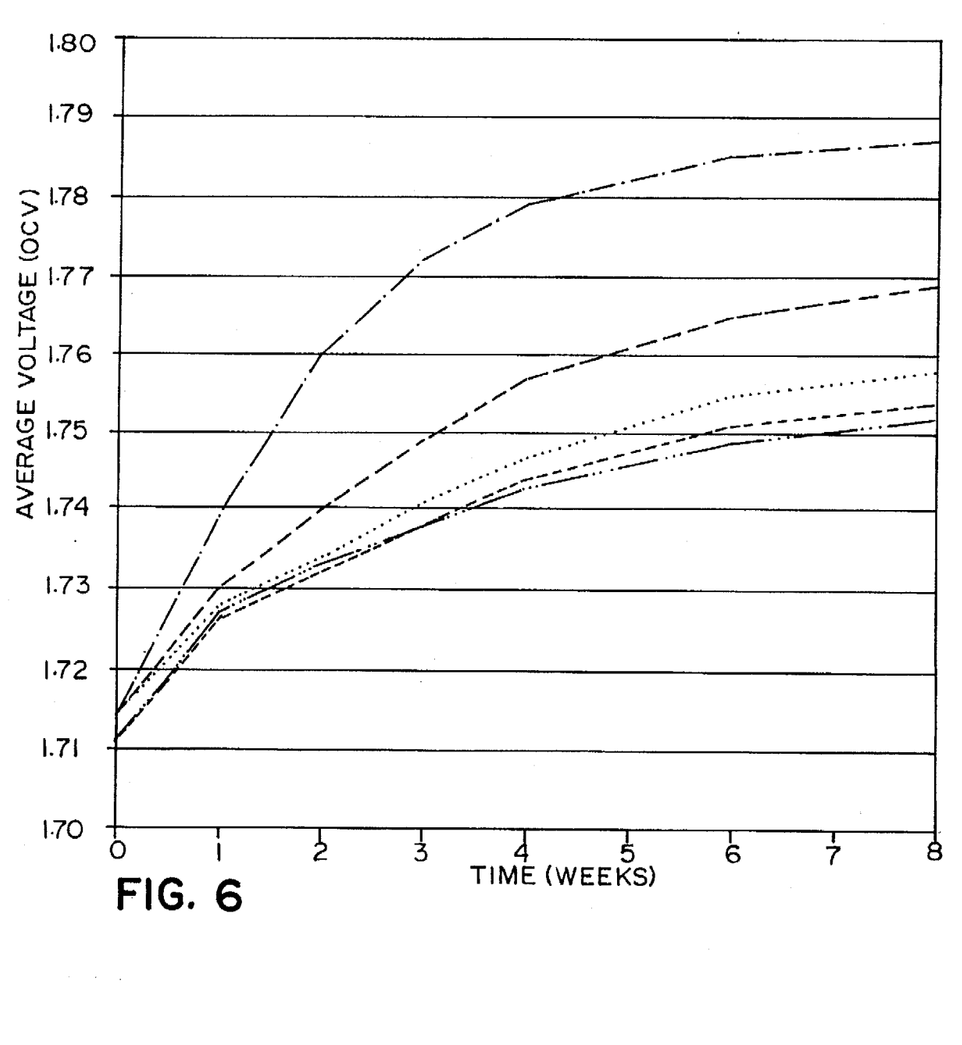
FIG. 6 is a graph of OCV verses time for cells containing LiI in the electrolyte as a primary conductive solute, and containing KI as an additive.

To evaluate the OCV lowering effect of potassium salt additives in a $Li/FeS_2$ cell using an electrolyte solution having a lithium salt other than $LiCF_3SO_3$ as the primary conductive solute, potassium iodide was added in mounts of about 0.01, 0.02, 0.025 and 0.03 mol/l to an electrolyte comprised of about 0.75 mol/l of LiI in a solvent mixture consisting of about 65 vol. % 1,3-dioxolane and 35 vol. % 1,2-dimethoxyethane. As shown in FIG. 6, OCV suppression after 8 weeks ranged from about 18 to 33 mV. A maximum, saturated concentration of 0.03 mol/l of KI lowered the OCV less effectively than 0.03 mol/l in Example 5. It is suspected that KI may be less solvated in this electrolyte and not as easily transported to the anode surface.

The foregoing results of Examples 1–6 show that potassium salts, when added to an electrolyte solution used in an electrochemical cell having a lithium or lithium alloy anode, are effective at lowering OCV to a desirable level, generally between about 1.72 to 1.73 volts. Additionally, it has been noted that the desired OCV lowering has been achieved without any significant detrimental effects on cell performance. For example, storage of the cells at 60° C. over a prolonged period of time did not cause any loss in amperage, and there was no substantial change in charge transfer resistance due to the addition of the potassium salts. The electrolytic cells of the invention also exhibit improved rate performance, as demonstrated by the National camera flash tests.

The examples set forth are to enable a clear understanding of the concept herein, rather than as a limitation on the invention, use is intended to be limited only by the scope of the attached claims and the equivalents thereto.

The embodiments of the invention in which an exclusive property or privilege is claimed are defined as follows:

1. An electrochemical cell having an open circuit voltage, comprising:
   a lithium anode or a lithium alloy anode;
   a solid cathode; and
   a nonaqueous, liquid electrolyte including an organic solvent, an electrochemically active amount of a primary salt, other than lithium perchlorate, and an amount of a potassium salt which is effective to lower the open circuit voltage of said electrochemical cell.

2. The electrochemical cell of claim 1, wherein said primary salt is selected from the group consisting of lithium bromide, lithium iodide, lithium hexafluorophosphate, lithium hexafluoroarsenate, lithium tetrafluoroborate, lithium trifluoromethanesulfonate, and combinations thereof.

3. The electrochemical cell of claim 2, wherein said potassium salt is selected from the group consisting of potassium trifluoromethanesulfonate, potassium carbonate, potassium hexafluoroarsenate, potassium tetrafluoroborate, potassium tetraalkylborates, potassium tetraphenylborates, potassium halides, potassium perchlorate, potassium hexafluorophosphate, potassium perfluoroalkylsulfonates, potassium bis(perfluoroalkylsulfonyl)imides, potassium tetra(perfluoroalkylsulfonyl)phosphates, potassium bis(perfluoroalkylsulfonyl)methides, potassium tris(, perfluoroalkylsulfonyl)methides, potassium bis(perfluoroalkylcarbonyl)methides, potassium tris(perfluoroalkylcarbonyl)methides, and combinations thereof.

4. The electrochemical cell of claim 1, wherein said potassium salt is present in an amount of from about 0.001 to about 0.5 mol/l.

5. The electrochemical cell of claim 4, wherein said primary salt is present in an amount of from about 0.1 to about 5 mol/l.

6. The electrochemical cell of claim 5, wherein said organic solvent is selected from the group consisting of acyclic ethers, cyclic ethers, acyclic carbonates, cyclic carbonates, formates, amides, sulfones, nitriles, nitromethane, 3,5-dimethylisoxazole, γ-butyrolactone, and combinations thereof.

7. The electrochemical cell of claim 1, wherein said solid cathode is comprised of an active material selected from the group consisting of $FeS_2$, $MnO_2$, and $TiS_2$.

8. The electrochemical cell of claim 1, wherein said solid cathode is comprised of fluorinated carbon.

9. An electrochemical cell, comprising:
   a lithium anode or a lithium alloy anode;
   a solid cathode comprising one or more of the group consisting of $FeS_2$, $MnO_2$ and $TiS_2$; and
   a nonaqueous, liquid electrolyte including an organic solvent, an electro-chemically active amount of a primary salt, and about 0.005 to 0.1 mol/l of a potassium salt.

10. The electrochemical cell of claim 9, wherein said potassium salt is selected from the group consisting of potassium trifluoromethanesulfonate, potassium carbonate, potassium hexafluoroarsenate, potassium tetrafluoroborate, potassium tetraalkylborates, potassium tetraphenylborates, potassium halides, potassium perchlorate, potassium hexafluorophosphate, potassium perfluoroalkylsulfonates, potassium bis(perfluoroalkylsulfonyl)imides, potassium tetra(perfluoroalkylsulfonyl)phosphates, potassium bis(perfluoroalkylsulfonyl)methides, potassium tris(perfluoroalkylsulfonyl)methides, potassium bis(perfluoroalkylcarbonyl)methides, potassium tris(perfluoroalkylcarbonyl)methides, and combinations thereof.

11. The electrochemical cell of claim 10, wherein said primary salt is present in an amount of from about 0.1 to about 5 mol/l.

12. The electrochemical cell of claim 11, wherein said primary salt is selected from the group consisting of lithium bromide, lithium iodide, lithium hexafluorophosphate, lithium hexafluoroarsenate, lithium tetrafluoroborate, lithium trifluoromethanesulfonate, and combinations thereof.

13. The electrochemical cell of claim 5, wherein said organic solvent is selected from the group consisting of acyclic ethers, cyclic ethers, acyclic carbonates, cyclic carbonates, formates, amides, sulfones, nitriles, nitromethane, 3,5-dimethylisoxazole, γ-butyrolactone, and combinations thereof.

14. An electrochemical cell, comprising:
   a lithium anode or a lithium alloy anode;
   a solid active metal cathode; and
   a nonaqueous, liquid electrolyte including an organic solvent, an electrochemically active amount of a primary salt selected from the group consisting of lithium halides, lithium hexafluorophosphates, lithium hexafluoroarsenates, lithium trifluoromethanesulfonate, and combinations thereof, and more than 0.001 mol/l of a potassium salt additive selected from the group consisting of potassium trifluoromethanesulfonate, potassium carbonate, potassium tetrafluoroborate, potassium tetraalkylborates, potassium tetraphenylborates, potassium halides, potassium hexafluorophosphate, potassium perfluoroalkylsulfonates, and combinations thereof.

15. The electrochemical cell of claim 14, wherein said potassium salt is present in an amount from about 0.005 to 0.1 mol/l.

16. The electrochemical cell of claim 15, wherein said primary salt is present in an mount of from about 0.1 to about 5 mol/l.

17. The electrochemical cell of claim 16, wherein said solid cathode is comprised of an active material selected from the group consisting of $FeS_2$, $MnO_2$, and $TiS_2$.

18. An electrochemical cell, comprising:
   a lithium anode or a lithium alloy anode;
   a solid cathode comprising iron disulfide; and
   a nonaqueous, liquid electrolyte including an organic solvent, about 0.5 to 2 mol/l of a lithium salt selected from the group consisting of lithium halides, lithium hexafluorophosphate, lithium hexafluoroarsenate, lithium tetrafluoroborates, lithium trifluoromethanesulfonate, and combinations thereof, and about 0.005 to 0.1 mol/l of a potassium salt selected from the group consisting of potassium trifluoromethanesulfonate, potassium carbonate, potassium tetrafluoroborate, potassium tetraalkylborates, potassium tetraphenylborates, potassium halides, potassium hexafluorophosphate, potassium perfluoroalkylsulfonates, and combinations thereof.

19. The electrochemical cell of claim 18, wherein said lithium salt comprises about 0.5 to 2 mol/l of lithium trifluoromethanesulfonate, lithium iodide or a combination of both.

20. The electrochemical cell of claim 19, wherein said potassium salt comprises about 0.01 to 0.05 mol/l of potassium trifluoromethanesulfonate, potassium iodide or a combination of both.

* * * * *